United States Patent [19]

Plisky

[11] Patent Number: 4,501,043
[45] Date of Patent: Feb. 26, 1985

[54] RETAINER CLIP FOR WINDSHIELD WIPER BLADE ASSEMBLIES

[75] Inventor: John J. Plisky, Munster, Ind.

[73] Assignee: The Anderson Company of Indiana, Michigan City, Ind.

[21] Appl. No.: 554,249

[22] Filed: Nov. 22, 1983

[51] Int. Cl.³ ............................................. B60S 1/02
[52] U.S. Cl. ................................................. 15/250.42
[58] Field of Search ......................... 15/250.36–250.42

[56] References Cited

U.S. PATENT DOCUMENTS

| | | | |
|---|---|---|---|
| 2,983,945 | 5/1961 | De Pew | 15/250.42 |
| 3,823,437 | 7/1974 | Hauke | 15/250.42 |
| 3,866,261 | 2/1975 | Stratton | 15/250.42 |
| 3,919,736 | 11/1975 | Bourassa et al. | 15/250.42 |
| 4,009,503 | 3/1977 | Sharp | 15/250.42 |
| 4,388,742 | 6/1983 | Kimber et al. | 15/250.42 |

*Primary Examiner*—Peter Feldman
*Attorney, Agent, or Firm*—Wood, Dalton, Phillips, Mason & Rowe

[57] ABSTRACT

A claw retaining clip for a windshield wiper structure including a relatively rigid base with a locking post extending from one side thereof. A pair of relatively resilient fingers extend in generally parallel relation from the base and each terminates in a hook-like element receivable in grooves in a flexor of a blade. The fingers are provided with cam surfaces which may be engaged by a claw of a pressure applying superstructure to cam the fingers apart so as to allow the claw to enter a claw receiving recess formed intermediate the ends of the fingers in which movement of the claw is restrained. Projections carried by the fingers along with the hook-like elements and the post cooperate together to provide for positive retention of the retaining clip at a desired location on a flexor.

10 Claims, 7 Drawing Figures

U.S. Patent  Feb. 26, 1985  4,501,043
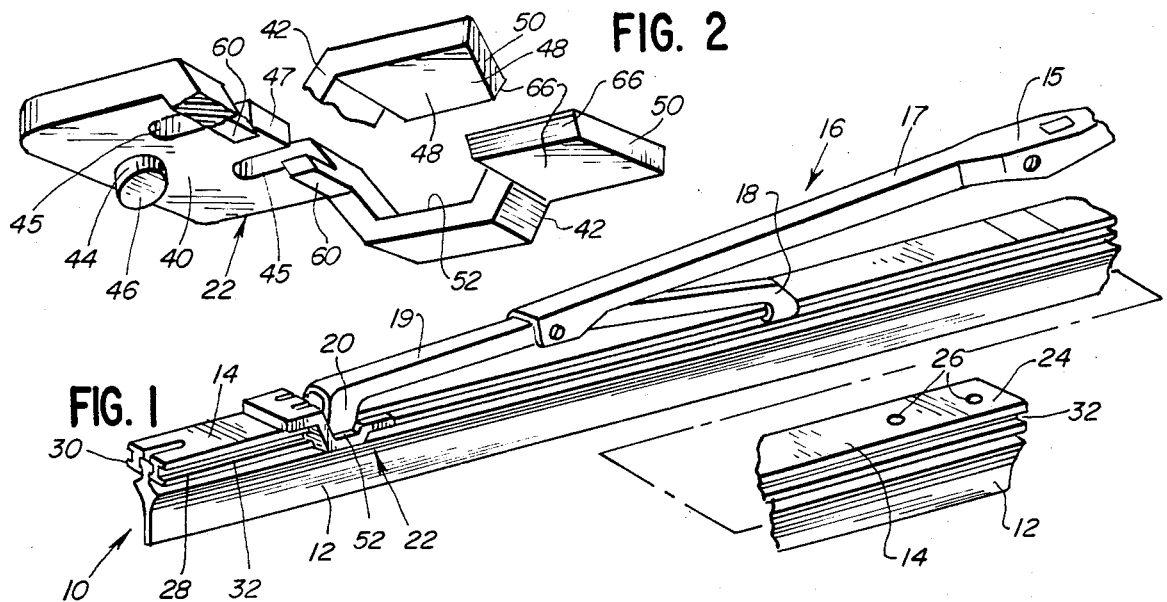
FIG. 1
FIG. 2
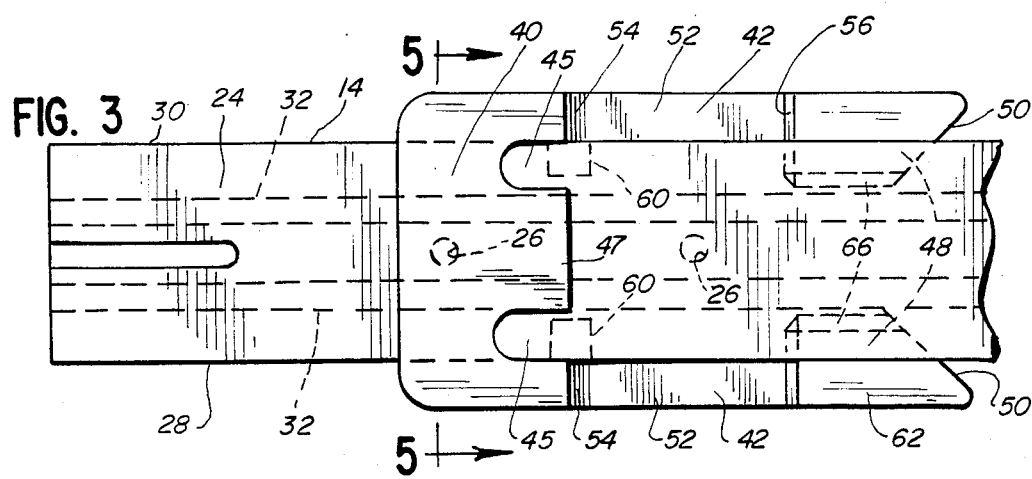
FIG. 3
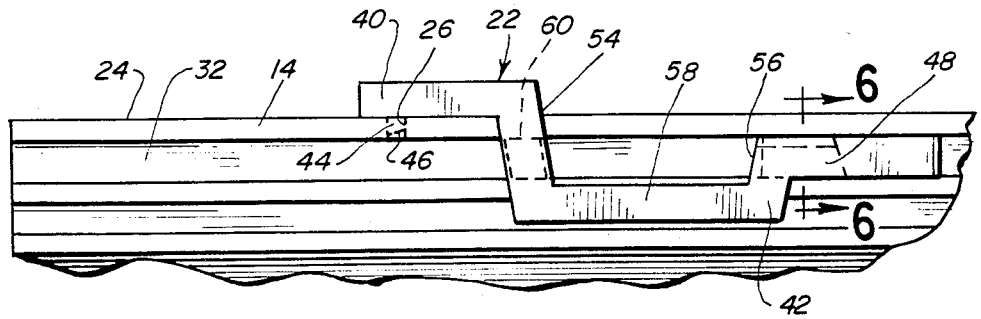
FIG. 4
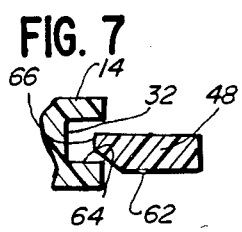
FIG. 7
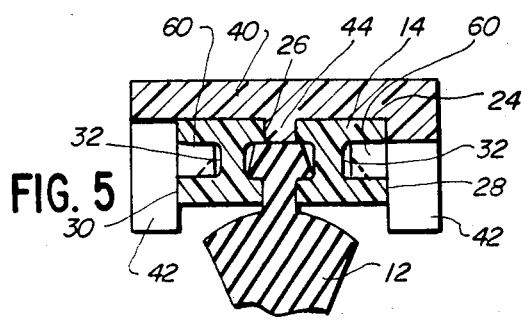
FIG. 5
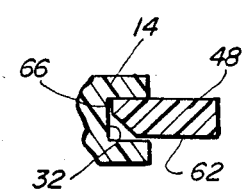
FIG. 6

4,501,043

RETAINER CLIP FOR WINDSHIELD WIPER BLADE ASSEMBLIES

FIELD OF THE INVENTION

This invention relates to windshield wiper structures of the sort including an elongated squeegee, an elongated flexor mounting the squeegee and a claw retaining clip for securing the squeegee and the flexor to a windshield wiper system. More specifically, the invention relates to a retaining clip for such windshield wiper assemblies.

BACKGROUND ART

Automotive experts quite typically recommend that the squeegees of windshield wiper assemblies be replaced at least annually as a consequence of their deterioration due to abrasion, aging, etc. To minimize the expense of replacement of an entire windshield wiper system including arm, pressure applying superstructure, and squeegee assembly, only the latter is replaced. In the usual case, the squeegee assembly includes both the squeegee itself and a flexor or backing which is applied to the existing pressure applying superstructure mounted on the wiper arm.

Of course, some means must be provided whereby the squeegee assemblies may be easily disassembled from and replaced on the superstructure which also provides for positive retention of the squeegee assembly on the superstructure during use.

As a consequence, there have been a large variety of proposals for retainer clips to accomplish this purpose. Representative of such attempts, and constituting the most pertinent prior art known to the applicant are the following: U.S. Pat. No. 3,626,544 issued Dec. 14, 1971 to Lopez; U.S. Pat. No. 3,879,794 issued Apr. 29, 1975 to Roberts; U.S. Pat. No. 3,919,736 issued Nov. 18, 1975 to Bourassa; U.S. Pat No. 4,009,503 issued Mar. 1, 1977 to Sharp; U.S. Pat. No. 4,156,951 issued June 5, 1979, also to Sharp; U.S. Pat. No. 4,388,742 issued June 21, 1983 to Kimber; and U.S. Pat. No. 4,389,746 issued June 28, 1983 to Riester. Also of possible relevance are French patent publication No. 2,443,354 and German Gebrauchsmuster No. E82 20 739.9. Of the foregoing, U.S. Pat. No. 4,388,742 to Kimber may be the most relevant.

The retainers of each of the foregoing patent publications have a variety of advantages and accompanying disadvantages which will be readily appreciated by those skilled in the art. In general, it is desirable that the clip be easily handled, both during an assembly and a disassembly process, that it has sufficient strength as to not be broken or permanently distorted during installation or removal of a squeegee assembly, that it have universal applicability in terms of accommodating superstructures of various configurations and the ability to mount squeegee assemblies of varying length, that it provide for positive retention and firm securement of the squeegee assembly to the superstructure and that it provide a high degree of retention in the proper placement during the assembly process.

In general, the prior art suffers from the deficiency of being unable to fulfill one or more of the foregoing desirable attributes of a retaining clip. The present invention is directed to providing a retaining clip that fulfills all of the foregoing desirable attributes.

Summary of the Invention

It is the principal object of the invention to provide a new and improved windshield wiper structure. More specifically, it is an object of the invention to provide a new and improved retaining clip for a claw of a windshield wiper superstructure whereby a squeegee structure may be easily mounted thereto or removed therefrom.

An exemplary embodiment of the invention achieves the foregoing object in a windshield wiper structure including an elongated squeegee and an elongated flexor mounting the squeegee. The flexor has a top surface opposite the squeegee and opposed side surfaces with the top surface including a plurality of apertures for universal mounting purposes and with the side surfaces each including at least one longitudinal groove. A claw retaining clip is formed of a relatively rigid base having a locking post extending from one side thereof for entry into a selected one of the apertures. At least one relatively resilient finger extends from the base and terminates in a hook-like element extending to a side of the finger and displaced from the plane of the base such that when the base is in substantial abutment with the top surface of the flexor, the hook-like element will be received in the groove in the adjacent side surface. The end of the finger remote from the base has a cam surface which, when engaged by a claw, will allow the claw to cam the finger and the hook-like element away from the groove as the claw moves towards the base. The finger has a claw receiving recess intermediate its ends. Opposed walls of the recess are configured to capture a claw and restrain movement of the claw toward or away from the base in the direction of elongation of the squeegee and the flexor. A projection on the finger intermediate its ends and displaced from the plane of the base is located so as to enter the groove in the adjacent side surface. The recess is located between the projection and the hook-like element in the finger.

According to a highly preferred embodiment, there are two such fingers and corresponding structure which extend in generally parallel relation away from the base.

The invention contemplates that the hook-like elements include generally facing cam surfaces configured to cam the associated hook-like element toward the plane of the base upon entry of the hook-like element into the groove in the associated side surface. This structure in turn may produce a rotative force about the axis defined by the projections to firmly urge the post into the associated aperture in the flexor to assure good retaining qualities and proper location of the retaining clip on a squeegee structure during assembly of the squeegee structure to a superstructure.

In a highly preferred embodiment, the cam surfaces on the hook-like elements comprise beveled surfaces thereon.

Other objects and advantages will become apparent from the following specification taken in connection with the accompanying drawings.

DESCRIPTION OF THE DRAWINGS

FIG. 1 is a perspective view of a windshield wiper structure made according to the invention;

FIG. 2 is an enlarged, fragmentary view of a retaining clip employed in the invention;

FIG. 3 is an enlarged, fragmentary plan view of the clip applied to a flexor;

FIG. 4 is a side elevation of the clip applied to a flexor;

FIG. 5 is a sectional view taken approximately along the line 5—5 in FIG. 3;

FIG. 6 is a fragmentary sectional view taken approximately along the line 6—6 in FIG. 4; and FIG. 7 is a view similar to FIG. 6 illustrating a relationship of hook-like elements to a groove in the flexor during the assembly process.

DESCRIPTION OF THE PREFERRED EMBODIMENT

An exemplary embodiment of the invention is illustrated in the drawings and with reference to FIG. 1 is seen to include a squeegee assembly, generally designated 10, composed of an elongated blade or squeegee 12 formed of any suitable elastomer and provided with a stiffening backing or flexor 14 of considerably greater rigidity than the squeegee 12. Suitable materials of which the flexor 14 may be formed are well known in the art and form no part of the present invention.

Conventional windshield wiper superstructure is fragmentarily illustrated in FIG. 1 and generally designated 16. The same is attached to a wiper arm through a connector 15 on a primary yoke 17 in a conventional fashion and includes at least one secondary yoke 19 with pairs of claws 18 and 20, also of conventional construction, for mounting to the flexor 14. In the usual case, the superstructure 16 will include a plurality of more than two of the pairs of claws and only one such pair of claws, such as the pair of claws 20 is intended to be fixed relatively immovably to the flexor 14.

To achieve this end, a retaining clip, generally designated 22, is employed to removably affix the claws 20 to the flexor 14 at a desired location thereon.

As seen in FIG. 1, the flexor 14 has a planar upper surface 24 on its side opposite the squeegee 12 and such surface is provided with a plurality of apertures 26 in a desired spaced relation for cooperation with the clip 22 to thereby locate the squeegee structure 12 in a desired relation with respect to the claws 20 by means that will be seen. The purpose of employing a plurality of the apertures 26 is to allow the selection of an appropriate one of the apertures 26 for a given windshield and wiper system. In other words, through the use of a plurality of appropriately positioned ones of the apertures 26, universal application of a given squeegee structure 10 may be achieved.

As best seen in FIG. 5, the flexor 14 includes opposed side surfaces 28 and 30 and each is provided with a longitudinally extending groove 32. The grooves 32 receive facing parts of the pairs of claws 18 and 20 of conventional construction as is well known and, in addition, parts of the retaining clip 22 as well.

The retaining clip 22 is perhaps best seen in FIG. 2 and in the preferred embodiment, is a unitary assembly, preferably formed of molded plastic, although the same could be a stamped metal part if desired. The clip 22 includes a base 40. The base 40 is relatively rigid as compared to the remainder of the clip because it is solid, i.e. lacking reliefs or grooves, across its width as seen in FIGS. 2 and 3.

Extending from one side of the base 40, in generally parallel spaced relation, are relatively flexible fingers 42. The base 40 serves to locate the clip 22 at a desired aperture 26 on the flexor 14 while the fingers 42 serve to capture the pair of claws such as the claws 20 to fix the position of the superstructure longitudinally of the flexor 14. It will be noted that the base 40 is separated in part from the fingers 42 by short kerfs or cuts 45. The cuts 45 extend the lengths of the fingers for better flexing and less strained flexing of the fingers relative to the base. The overhang 47 between the kerfs acts as a lever as will be described more hereinafter.

To accomplish the first function mentioned above, the base 40, on its lower surface, includes a transversely projecting locking post 44 dimensioned to be received in one of the apertures 26. The post 44 projects from the solid, uninterrupted part of the base 40 so as to be somewhat rigidly supported thereby. The surface of the post 44 remote from the base 40 is beveled as at 46 such that the surface faces the fingers 42. As will be seen, during installation or removal of a squeegee assembly 10 from the superstructure 16, some pivoting action of the clip 22 takes place and the aforementioned bevel 46 provides for ease of entry or egress of the post 44 relative to the apertures 26 during such pivotal movement without adversely affecting firm securement of the clip 22 to the flexor 14.

Each of the fingers 42 terminates in facing hook-like elements 48. The hook-like elements 48 are adapted to be received in a corresponding one of the grooves 32 in the adjacent side surface 28 or 30 of the flexor 14, are displaced from the plane of the base 40 to the side thereof from which the post 44 extends and are spaced from each other such that when the base 40 is in substantial abutment with the surface 24 of the flexor 14 as illustrated in FIG. 4, the hook-like elements will be received in the grooves 32 as mentioned earlier and as shown in FIGS. 3–5 inclusive.

As best seen in FIGS. 2 and 3, the ends of each of the fingers are provided with cam surfaces 50 for purposes to be seen.

Intermediate the ends of each of the fingers 42 is a claw receiving recess or offset 52. The recesses 52 are configured to capture a pair of claws such as the claws 20 as illustrated in FIG. 1 and restrain movement of the claws 20 toward or away from the base 40 of the clip in the direction of elongation of the squeegee 12 and the flexor 14. To this end, each of the recesses or offsets 52 is provided with opposed and sloped walls 54 and 56 between which the claws 20 may nest when the various components are properly assembled.

To achieve entry of the claw 20 into the recesses 52, the claws, with components thereof received in the grooves 32, are moved against the cam surfaces 50. Because the fingers 42 are relatively thin as compared to the base 40, that is, have a lesser cross-sectional area at any given point, they are relatively flexible and resilient as compared to the base 40. Thus, interaction of the claws 20 with the cam surfaces 50 will cam the hook-like elements 48 out of the groove 32 sufficiently so as to allow the claws 20 to pass such hook-like elements until the claws abut the recessed wall 54. At this time, all parts of the claws 20 will be free from engagement with the hook-like elements 48 and the same, by reason of the resilience of the fingers 42, will return into the grooves 32 such that the walls 56 of the recesses 42 will block movement of the claws 20 out of the recesses 42 in the direction away from the base 40.

It will be observed that the recesses or offsets 52 are intermediate the ends of the fingers 42, that is, between the base 40 and the hook-like elements 48 and are essentially defined by planar portions 58 of the corresponding finger 42, a relatively long connecting portion defined by the wall 54 extending between the planar portion 58 and the base 40 and a shorter connecting portion defined by the wall 56 extending from the planar portion 58 to the corresponding hook-like element 48. The planar portion 58 is displaced from the plane of the base 40 sufficiently so as to allow the conventional structure on the claw 20 to be received freely within the grooves 32.

Each of the fingers 42 carries an inwardly directed projection 60 with the projections 60 facing each other. The projections 60 are located intermediate the ends of the fingers 42 and are displaced from the plane of the base 40 so as to enter the groove 32 on the adjacent side surface 28 or 30 of the flexor 14. The projections 60, when received in the grooves 32 allow the retainer clip 22 to be pivoted from the position illustrated in the drawings with the hook-like elements 48 out of the grooves 32 so that the post 44 may be located in a desired one of the apertures 26. At the same time, when the hook-like elements 48 are in the grooves 30, the same along with the projections 60 prevent any pivotal or rotative movement of the clip 22 thereby positively assuring that the post 40 is positively located within a desired aperture 26.

To enhance the aforementioned retaining action, the hook-like elements 48 may be made such that their lower surfaces 62 (FIG. 7) normally will assume a position slightly below the lower side wall 64 of the grooves 30 when the base 40 is in substantial abutment with the surface 24, the overhang 47 is in contact with the back 24 of the flexor and the post 44 is within an aperture 26. Consequently, when the hook-like elements 48 fully enter the groove 32 as seen in FIG. 6, a bending moment in the fingers 42 will be created tending to cause rotation of the clip 22 in a clockwise direction as viewed in FIG. 4 about a pivot axis defined by the projection 60. This in turn will cause the base 40 bearing the post 44 to be urged downwardly as seen in FIG. 4 to firmly urge the projection 44 into the desired aperture 26.

Because this configuration necessarily involves interference between the hook-like elements 48 and the flexor 14, to relieve the interference that might otherwise prevent proper entry of the hook-like elements 48 into the grooves 34, the facing surfaces 66 of the hook-like elements 48 are downwardly beveled as best seen in FIGS. 2, 6 and 7. The beveled surfaces 66 thus act as cam surfaces when they engage the edge of the flexor 14 adjacent the grooves 32 as illustrated in FIG. 7 tending to cam the associated hook-like element 48 upwardly such that the resilience of the associated finger 42 may move the hook-like element 48 fully into the adjacent groove 32.

From the foregoing, it will be appreciated that a windshield wiper structure made according to the invention, and particularly the retaining clip thereof provides all of the desired attributes of a retaining clip as identified earlier. The same does not require extensive manipulation when a squeegee structure 10 is installed on or removed from a superstructure 16 and is adapted for universal use.

To disconnect the superstructure from the squeegee assembly 10 to replace the squeegee assembly, the hook-like elements 48 are spread apart as by engaging a finger nail against the cam surfaces 50 on each side of the flexor to spread the hook-like elements so that the pair of claws 20 can be slid along the flexor out of engagement with the clip 22. The superstructure is then slid along the flexor until it is disassembled from the squeegee assembly. A new replacement squeegee assembly can now be assembled with the superstructure.

I claim:

1. In a windshield wiper structure including an elongated squeegee, an elongated flexor mounting said squeegee and having a top surface opposite said squeegee and opposed side surfaces, said top surface including a plurality of apertures and said side surfaces each including at least one longitudinal groove, a claw retaining clip comprising a relatively rigid base having a locking post extending from one side thereof for entry into a selected one of said apertures, a pair of relatively resilient spaced fingers extending in generally parallel relation from said base and each terminating in hook-like elements directed toward the other one of said fingers and displaced from the plane of said base and spaced from each other such that when said base is in substantial abutment with said top surface, said hook-like elements will be received in a corresponding one of said grooves in the adjacent one of said side surfaces, the ends of said fingers remote from said base each having a cam surface, which when engaged by a claw, will allow the claw to cam said fingers and said hook-like elements apart as the claw moves toward said base, each of said fingers having a claw receiving recess intermediate its ends, opposed walls of each said recess being configured to capture a claw and restrain movement of the claw toward or away from said base in the direction of elongation of said squeegee and said flexor, and two facing projections, one on each finger intermediate its ends and displaced from the plane of said base so as to enter the groove on the adjacent side surface, said recesses being located between the projection and the hook-like element on the associated finger.

2. The windshield wiper structure of claim 1 wherein said locking post extends transversely from said base and has a bevelled surface remote from said base and facing said fingers.

3. The windshield wiper structure of claim 1 wherein said hook-like elements include generally facing cam surfaces configured to cam the associated hook-like element toward the plane of said base upon entry of the hook-like element into the groove in the associated side surface.

4. The windshield wiper structure of claim 3 wherein each of said cam surfaces comprises a bevel.

5. The windshield wiper structure of claim 1 wherein each of said recesses is defined by a planar portion of the corresponding finger spaced from the plane of said base to the side thereof having said post, a relatively long connecting portion interconnecting said planar portion and said base and mounting a corresponding one of said projections and a relatively short connecting portion interconnecting said planar portion and the corresponding hook-like element.

6. In a windshield wiper structure including an elongated squeegee, an elongated flexor mounting said squeegee and having a top surface opposite said squeegee and opposed side surfaces, said top surface including a plurality of apertures and said side surfaces each including at least one longitudinal groove, a claw retaining clip comprising a relatively rigid base having a locking post extending from one side thereof for entry into a selected one of said apertures, at least one relatively resilient finger extending from said base and terminating in a hook-like element extending to a side of the finger and displaced from the plane of said base such that when said base is in substantial abutment with said top surface, said hook-like element will be received in one of the grooves in the adjacent one of said side surfaces, the end of said finger remote from said base having a cam surface, which when engaged by a claw, will allow the claw to cam said finger and said hook-like element away from said one groove as the claw moves toward said base, said finger having a claw receiving recess intermediate its ends, opposed walls of said recess being configured to capture a claw and restrain movement of the claw toward or away from said base in the direction of elongation of said squeegee and said flexor, and a projection on said finger intermediate its ends and displaced from the plane of said base so as to enter the groove on the adjacent side surface, said recess being located between the projection and the hook-like element on the associated finger, the displacement of said hook-like element from the plane of said base further being such as to create a rotative force about said projection to urge said post into said selected aperture when said hook-like element is in said one groove.

7. In a windshield wiper structure including an elongated squeegee, an elongated flexor mounting said squeegee and having a top surface opposite said squeegee and opposed side surfaces, said top surface including a plurality of apertures and said side surfaces each including at least one longitudinal groove, a claw retaining clip comprising a relatively rigid base having a locking post extending from one side thereof for entry into a selected one of said apertures, at least one relatively resilient finger extending from said base and terminating in a hook-like element extending to a side of the finger and displaced from the plane of said base such that when said base is in substantial abutment with said top surface, said hook-like element will be received in the one of the grooves in the adjacent one of said side surfaces, the side of the hook-like element facing said one groove including a cam surface configured to cam the hook-like element toward the plane of the base upon entry into said one groove, the end of said finger remote from said base having a cam surface, which when engaged by a claw, will allow the claw to cam said finger and said hook-like element apart away from said one groove as the claw moves toward said base, said finger having a claw receiving recess intermediate its ends, opposed walls of said recess being configured to capture a claw and restrain movement of the claw toward or away from said base in the direction of elongation of said squeegee and said flexor, and a projection on said finger intermediate its ends and displaced from the plane of said base so as to enter the groove on the adjacent side surface, said recess being located between the projection and the hook-like element on the finger.

8. The windshield wiper structure of claim 7 wherein there are two said fingers and associated hook-like elements extending from said base in generally parallel relation, each said finger having one of said recesses and one of said projections.

9. The windshield wiper structure of claim 7 wherein said first named cam surface comprises a bevel.

10. The windshield wiper structure of claim 7 wherein the displacement of said hook-like element from the plane of said base is further such as to create a rotative force about said projection to urge said post into said selected aperture when said hook-like element enters said one groove.

* * * * *